United States Patent
Binford, Jr. et al.

(10) Patent No.: US 6,285,405 B1
(45) Date of Patent: Sep. 4, 2001

(54) SYSTEM AND METHOD FOR SYNCHRONIZING DATA SIGNALS

(75) Inventors: Donald D. Binford, Jr., Round Rock; Matthew W. Korte; William J. Jackman, both of Austin, all of TX (US)

(73) Assignee: VTEL Corporation, Austin, TX (US)

(*) Notice: Subject to any disclaimer, the term of this patent is extended or adjusted under 35 U.S.C. 154(b) by 0 days.

(21) Appl. No.: 09/172,430

(22) Filed: Oct. 14, 1998

(51) Int. Cl.[7] .................................................. H04N 9/475
(52) U.S. Cl. .......................... 348/512; 348/515; 348/513
(58) Field of Search ..................................... 348/512, 513, 348/515; H04N 9/475

(56) References Cited

U.S. PATENT DOCUMENTS 5,533,021 * 7/1996 Branstad ........................... 348/512

* cited by examiner

Primary Examiner—Sherrie Hsia
(74) Attorney, Agent, or Firm—Skyjerven Morrill MacPherson LLP; Mary Jo Bertani

(57) ABSTRACT

A system for dynamically determining and introducing time delay values for synchronizing different data signals. For transmitting the data signals, encoding time delay is measured in one encoder, a target encoder time delay value is determined, and the target encoder time delay value is utilized in another encoder to delay transmission of one data signal relative to the transmission of the other data signal. When encoded data signals are received and processed for presentation, the time required to decode a first data signal in a first decoder is measured, a target decoder time delay value is determined based on the time required to decode the first data signal, and the target decoder time delay value is utilized to delay presentation of a second data signal relative to the presentation of the first data signal.

24 Claims, 5 Drawing Sheets

SYSTEM AND METHOD FOR SYNCHRONIZING DATA SIGNALS

BACKGROUND OF THE INVENTION

1. Field of the Invention

This invention relates to communications systems and more particularly to a method and apparatus for synchronizing audio and video data in video conferencing systems.

2. Description of the Related Art

A video conference environment typically includes a plurality of conference sites, commonly referred to as endpoints, which are geographically separated but electronically linked together to enhance collaboration between and among individuals at the various conference sites. A video conference system attempts to replicate the interpersonal communication and information sharing which would occur if all the participants were together in the same room at the same time.

Two or more endpoints participating in a video conference are coupled together via digital communication lines. For example, in a point-to-point conference, two endpoints are coupled in a video conference. One endpoint dials the other endpoint directly to initiate the video conference. In a multi-point video conference involving more than two endpoints, each endpoint dials a multiple point control unit (MCU) which couples the endpoints in the same video conference.

Each endpoint typically transmits and receives conference information (e.g., audio and video information) to and from the other endpoint(s). Each conference site includes at least one source of conference information. For example, each endpoint has one or more audio and video sources from which to select for transmission to the other endpoint(s). When audio and video signals are transmitted, synchronizing presentation of the signals at the other endpoints is referred to as "lip synching" and is an important element in user satisfaction with video conferencing. For example, when a close-up image of an individual speaking at one endpoint is displayed on monitors at the other endpoints, it is desirable for the speaker's voice to match movement of the speaker's mouth.

Communication standards such as H.320, H.324, and H.323 for video conferencing systems use separate data streams for audio data and video data. Digital video images require more information to represent each frame of data compared to digital audio messages, and accordingly, more time is required to process video images compared to audio data streams.

A common technique for achieving lip sync in video conferencing systems is to use a table of static values representing the delay between the audio and video messages at various line rates. Currently, a user selects an audio delay setting from a property page on a system configuration property sheet. The property page allows the user to set delay values for both transmitted and received audio for each line rate, or to reset the list of values to default values. Controlling delay using a constant, static value is inadequate, however, because total delay is affected by line rate and video bit rate. Video bit rate is correspondingly affected by factors such as data rates, communication protocol, audio algorithm selection, and the number of data channels transmitted. These factors often change throughout the course of a video conference and it is therefore desirable for a video conferencing system to be capable of automatically adjusting the delays to keep the audio and video data streams synchronized.

SUMMARY OF THE INVENTION

In accordance with the teachings of the present invention, a method and an apparatus for adaptively synchronizing data signals are provided which substantially eliminate or reduce disadvantages and problems associated with the prior art. The present invention is applicable to systems where it is desirable to synchronize two or more data signals that require different amounts of time to encode, transmit, and decode, such as audio and video data signals in video conferencing systems.

In particular, a system for synchronizing transmission of encoded frames of data is provided which includes a first encoder coupled to a first interface to receive a first frame of data. The first encoder associates a first time tag with the first frame of data wherein the first time tag is based on the time the first frame of data was received from the first interface. The first encoder encodes the first frame of data to generate a first encoded frame of data, and associates a second time tag with the first encoded frame of data. The second time tag is based on the time the first frame of data was substantially encoded. The first encoder determines an encoding delay based on the first time tag and the second time tag, and transmits the encoding delay to a data processor. The system also includes a second encoder coupled to a second interface to receive a second frame of data. The second encoder is coupled to the data processor. The data processor is operable to transmit data to the second encoder and receive data from the second encoder. Further, the data processor generates a target delay value based on the encoding delay and an offset value, and transmits the target delay value to the second encoder. The second encoder receives the target delay value from the data processor, encodes the second frame of data, and transmits the second encoded frame of data at a time based on the target delay value.

The present invention also provides a system for synchronizing presentation of decoded frames of data which includes a data processor coupled to a first decoder and a second decoder. The first decoder associates a first time tag with a first frame of data based on the time the first frame of data was received from the data processor. The first decoder generates a first decoded frame of data, and associates a second time tag with the first decoded frame of data based on the time the first frame of data was substantially decoded. The first decoder determines a decoding delay based on the first time tag and the second time tag, and transmits the decoding delay to the data processor. The data processor generates a target delay value based on the decoding delay and an offset value, and transmits the target delay value to the second decoder. The second decoder receives the target delay value from the data processor, decodes the second frame of data to generate a second decoded frame of data, and transmits the second decoded frame of data at a time based on the target delay value.

A method and apparatus for measuring the amount of time required to encode a frame of video data is also provided which may be used to synchronize an audio data signal with a video data signal. The method includes receiving a frame of video data, associating a first time tag with the frame of video data based on the time the video data was received, encoding the frame of video data, associating a second time tag with the encoded video data based on the time the video data was substantially encoded, and determining the video encoding delay based on the first time tag and the second time tag.

A method and apparatus for measuring the amount of time required to decode a frame of encoded video data is also provided which may be used to synchronize an audio data signal with a video data signal. The method includes parsing encoded video data for a picture start code and a video encoding temporal reference, sampling a system timer to generate a first timer value, decoding the frame of encoded video data, sampling the system timer to generate a second timer value after decoding the frame of encoded video data, and determining the video decoding delay based on the first timer value and the second timer value.

A method and apparatus for introducing a target time delay value in an audio codec is also provided. The target time delay value is used to synchronize an audio data signal with a video data signal. The method includes determining a video time delay value, generating the target time delay value based on an offset value and the video time delay value, and transmitting the target time delay value to the audio codec.

In another embodiment, a plurality of video time delay values are determined, and an average value of the video time delay values is generated. The target time delay value is determined based on the average value of the video time delay values and the offset value.

In another embodiment, the offset value is based on a fixed data processing time delay value and an audio time delay value.

In another embodiment, the audio codec adjusts an actual time delay value based on the target delay value. The actual time delay value may be adjusted by ramping in the target delay value over a period of time.

An important technical advantage of the present invention is that it determines and utilizes time delay values dynamically and does not require operator intervention to synchronize the data signals. Further, the time delay values are adjusted dynamically as changes in the factors which impact the amount of time required to encode, transmit, and decode the various signals occur.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
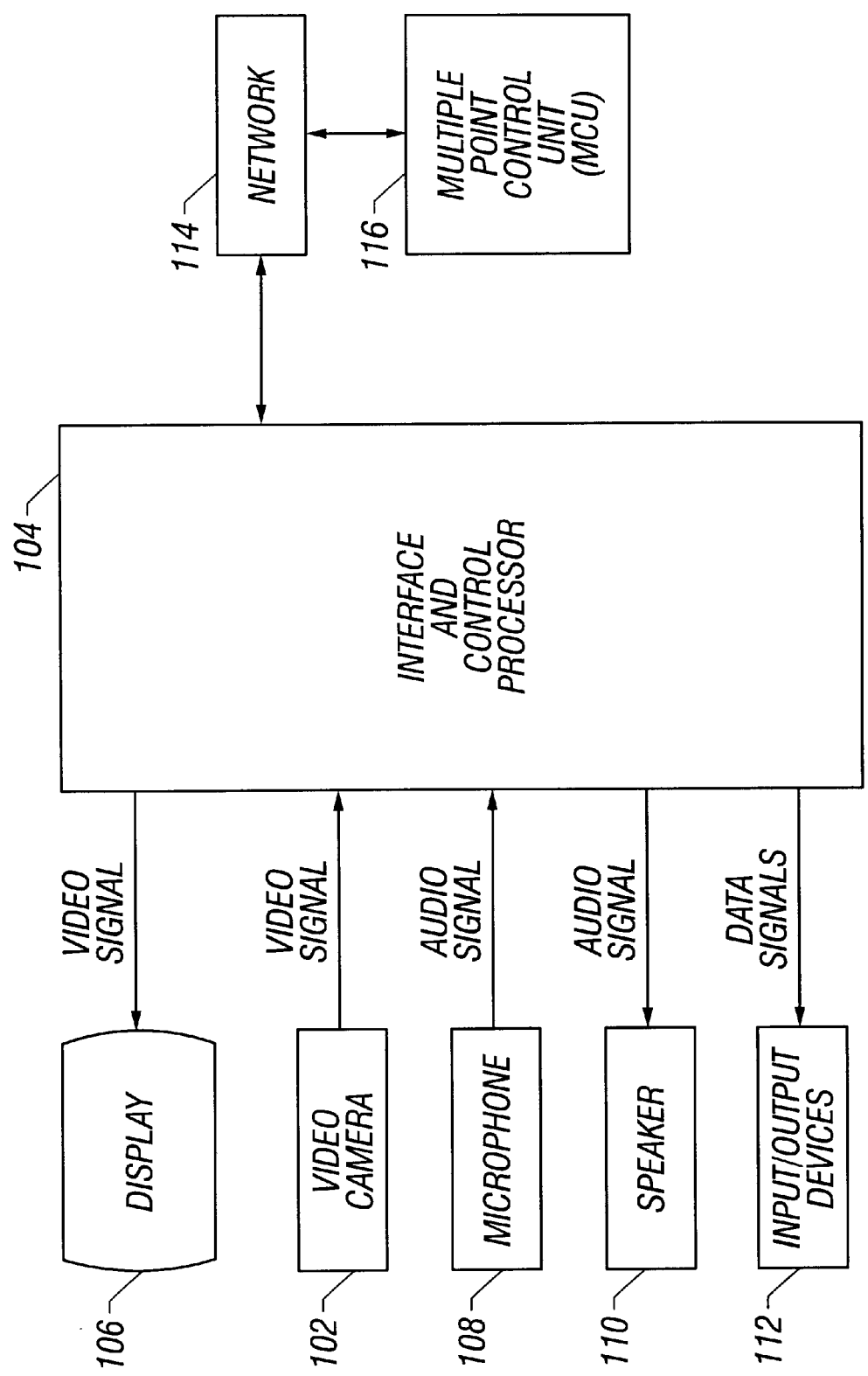
FIG. 1 is a block diagram of an endpoint in a video conferencing system.

FIG. 1 is a schematic block diagram of the arrangement of the components typically included in an endpoint 100 of a video conference system. The arrangement shown in FIG. 1 includes video camera 102 for capturing images of conference participants, their surrounding environment, and other objects within the field of view of video camera 102. Hardware and/or software controls (not shown) may be connected to video camera 102 for controlling pan, zoom, and tilt of the camera. Video camera 102 generates an analog or digital video signal of the captured image that is input to communication processor 104. One or more monitors 106 are connected to receive video signals from communication processor 104, wherein the video signals may include images from one or more of the endpoints connected to the video conferencing system. Monitors 106 may be capable of displaying images from multiple endpoints in a split screen format. Endpoint 100 also includes a microphone 108 for generating analog or digital audio signals, a speaker 110 for broadcasting audio information, and input/output devices 112 such as a keyboard, a mouse, voice recognition system, light pens, electronic pens, pen pads, touch screen displays and other devices connected to allow a user to generate inputs.

In the prior art, a property page on a system configuration property sheet may be displayed on monitor 106. Using one or more input/output devices 112, the user sets delay values for both transmitted and received audio for each line rate. The user may also reset the list of values to default values. The values are retained until changed by the user. In situations where data rates, communication protocol, audio algorithm selection, and other factors may change during a video conference, the static delay values may not be adequate to properly synchronize the audio and video data. In one embodiment of the present invention, the capability of entering static delay values is replaced by the capability of allowing a user to enable or disable adaptive, also referred to as dynamic, synchronization of audio and video data. If adaptive synchronization is disabled, no delay values are introduced. If adaptive synchronization is enabled, the present invention for determining and introducing delay values in the system is utilized. In another embodiment of the present invention, the user may still control audio delay settings via a property page, but additional settings are available to allow the user to enable or disable automatic, or dynamic, audio delay settings. If the user disables the dynamic delay feature, the delays may be set manually, as found in the prior art.

Multiple endpoints communicate via network 114. The endpoints may be coupled directly in a point-to-point call, or coupled through a central switch, commonly referred to as multiple point control unit (MCU) 116. Other video conference systems can also be connected with endpoint 100, for example in a multi-point call, and will generally be joined to the video conference through MCU 116. Each video conference system includes circuitry for transmitting and receiving compressed digital video and audio data, as well as other kinds of data, and thus the systems communicate over digital networks.

Figure 2:
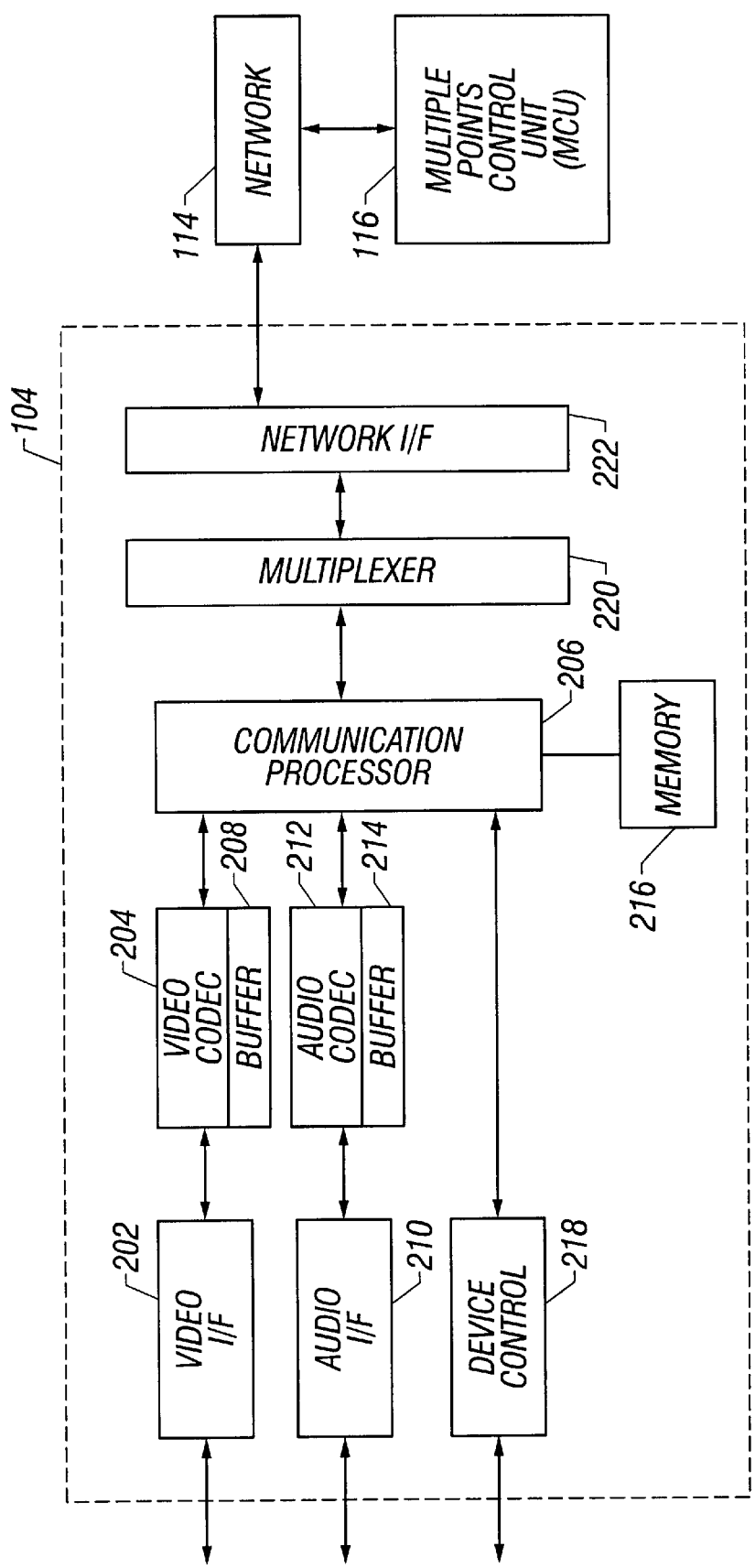
FIG. 2 is a block diagram showing the components of interface and control processing unit in one endpoint of the video conferencing system.

FIG. 2 shows further details of interface and control processor 104. A video interface 202 is provided for connection with camera 102 and display 106, and has an image processing function, such as screen division, image combination and character combination. Video interface 202 may also convert analog signals to digital signals and digital signals to analog signals, as required. A video coding-decoding unit (codec) 204 is provided for coding video signals supplied from video interface 202 or decoding coded video information received from communication processor 206 as input from another source such as another video conference endpoint. A video encoding routine or circuit processes raw video frame data from the endpoint into a compressed, encoded format and stores it in buffer 208 to await transmission to communication processor 206 or directly to some other component in the system. A video decoding routine or circuit in video codec 204 processes encoded video frame data from another endpoint for output to display 106. A video buffer routine controls input of raw video frame data from video interface 202, input of encoded video data from other sources through communication processor 206, output of encoded video frame data to communication processor 206, and output of raw video frame data to display 106.

Audio interface 210 is provided in interface and control processor 104 for connection with speaker 110 and microphone 108, and includes audio processing functions such as an echo canceling function, and converting analog signals to digital signals and digital signals to analog signals, as required. An audio coding-decoding unit (codec) 212 is coupled between audio interface 210 and communication processor 206 for coding audio signals supplied from audio interface 210 or decoding encoded audio information received from communication processor 206 as input from another source such as another video conferencing endpoint unit. An audio encoding routine or circuit in audio codec 212 processes raw audio data from the endpoint into a compressed, encoded format and stores it in buffer 214 to await transmission to communication processor 206 or directly to some other component in the system. An audio decoding routine or circuit in audio codec 212 processes encoded audio data from another endpoint for output to speaker 110. An audio buffer routine controls input of raw audio data from audio interface 202, input of encoded audio data from other sources through communication processor 206, and output of encoded audio data to communication processor 206.

Communication processor 206 is also coupled to memory 216, device control 218, and multiplexer 220 for transmitting and receiving data. Input/output devices 112 are connected to communication processor 206 through device control 218. Communication processor 206 executes instructions to control various processing functions and the flow of data through endpoint 100. One of the functions controlled by communication processor 206 is determining a delay period to synchronize audio information with video information. The present invention for determining the delay period is described in more detail herein below. Multiplexer 220 is coupled to network interface 222 for connection with network 114.

The present invention for determining the lip sync delay period includes measuring actual video encoding and video decoding delay in video codec 204. Once the video encoding and decoding delays are measured, the present invention controls lip sync by introducing the measured delay in audio encoding and audio decoding routines in audio codec 212. Video and audio signals transmitted by endpoint 100 must be synchronized by the time they reach network interface 222. A transmit audio delay is introduced so that outbound audio and video signals are synchronized when transmitted to network interface 222. Video and audio signals received by endpoint 100 are assumed to be, synchronized by the time they reach network interface 222. A receive audio delay is introduced so that corresponding audio and video signals are presented to the video conference participants simultaneously. To determine a dynamic delay value for synchronizing audio and video data, the video encoder incorporates a technique for measuring and reporting the amount of time required to encode the video data. The measured time includes the time from the acquisition of an image through the beginning of the transfer of the compressed image to communication processor 206. In order to synchronize video data with corresponding audio data, the video decoder includes a technique for measuring and reporting the amount of time required to decode video data. The decode delay includes the time from the beginning of the transfer of the encoded data to the video decoder to the actual display of the image.

Figure 3:
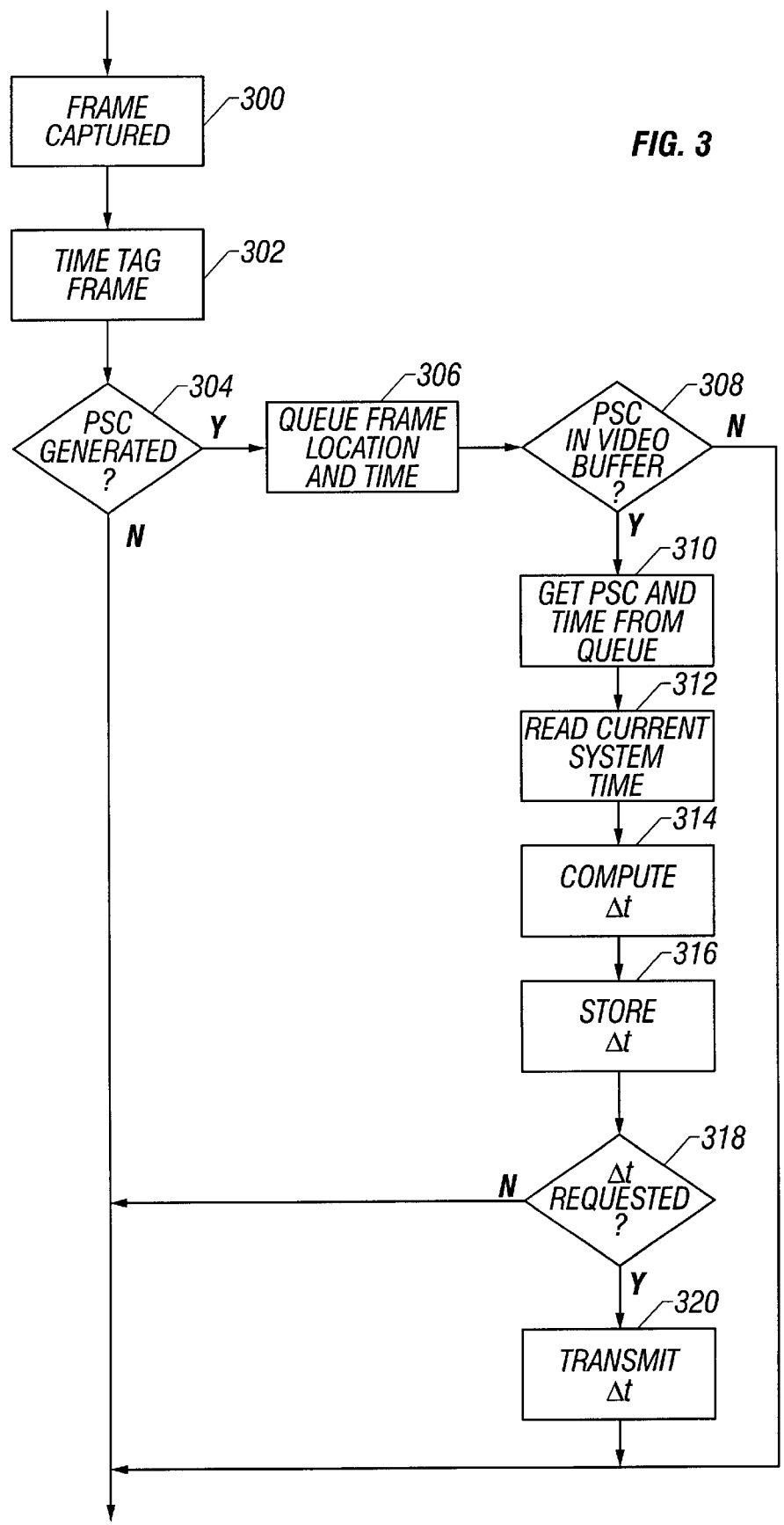
FIG. 3 is a flowchart diagram for measuring encoder delay.

A flowchart for measuring video encoding delay is shown in FIG. 3. In block 300, when a video frame is captured from video camera 102, the current value of a system clock in interface and control processor 104 is read and the current timer value is associated with the video frame as shown in block 302. The process of associating the current timer value with the video frame in block 302 is also referred to as time tagging the frame. When video codec 204 encodes the video frame, it generates a picture start code (PSC) for the frame. The PSC is a block of information pertaining to the encoded data including a temporal reference (TR) field. The temporal reference of a frame of video data is a value indicating the value of the system clock at the time the frame of video data was encoded. The starting location of the frame data in the video buffer is placed in a first queue, along with the time tag value, as shown in blocks 304 and 306. In block 308, when the video buffer transfer routine transfers information out of video codec 204, it checks the first queue as shown in block 308 to determine if there is a PSC for the data currently being transferred. If so, the PSC and the time tag are retrieved from the first queue as shown in block 310, the current time is read from interface and control processor 104 in block 312, and the difference in time between the time tag and the current time is determined in block 314 and placed in a second queue as shown in block 316. The value from queue 2 is supplied when communication processor 206 requests the value for the encoding delay as shown in blocks 318 and 320. Note that if a PSC is not received for a frame, as shown in block 304, the encoding delay is not calculated.

Figure 4:
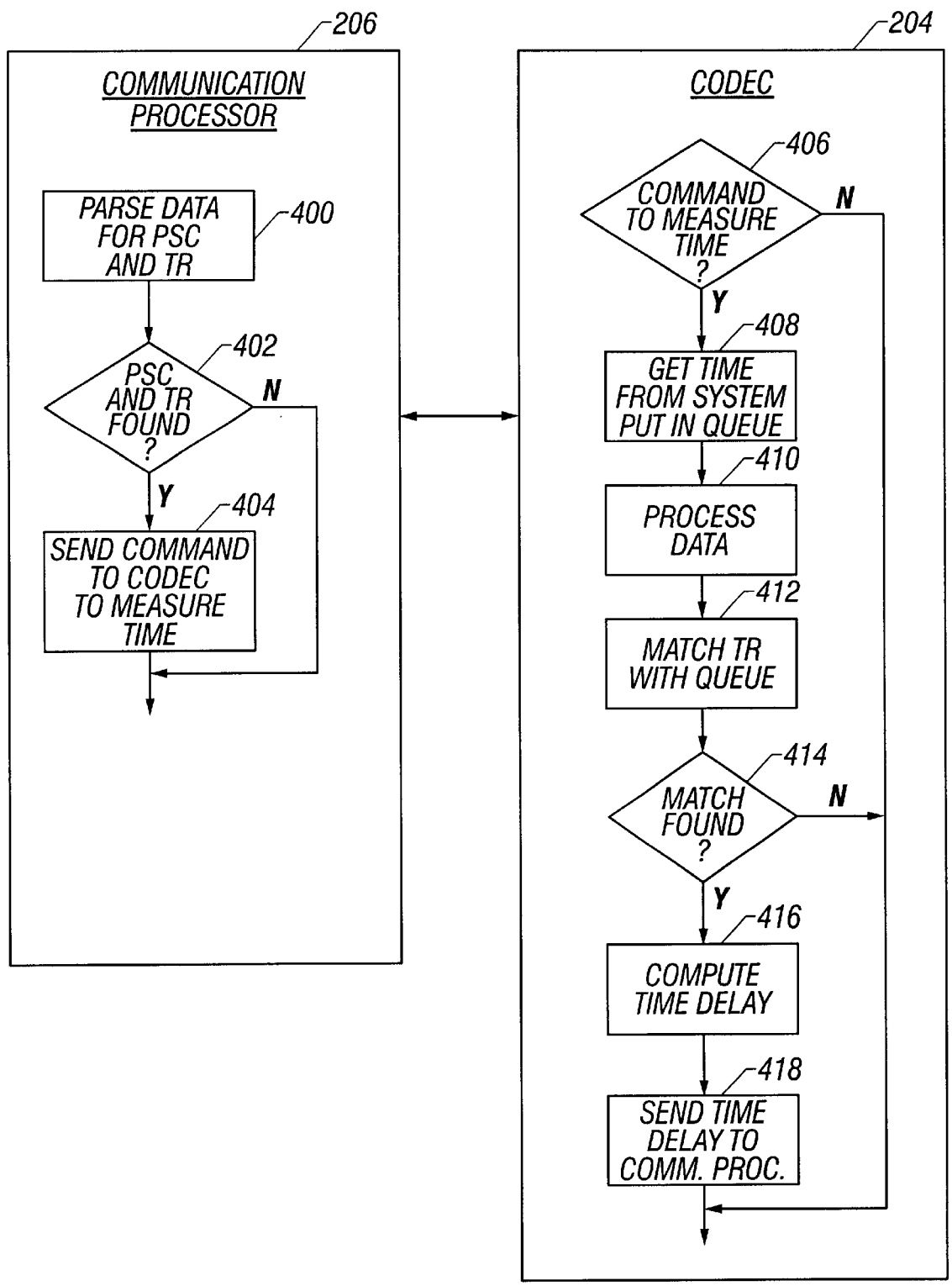
FIG. 4 is a flowchart diagram for measuring decoder delay.

FIG. 4 shows a flowchart diagram for measuring video decoding delay. In block 400, communication processor 206 parses encoded video data for the presence of a PSC and a temporal reference (TR) value. In blocks 402 and 404, when the communication processor 206 finds a PSC and a temporal reference value for a frame of video data, communication processor 206 sends commands to the video decoder to perform time measurements related to the decoding delay including measuring the current system time, taking a second time measurement when a frame with a temporal reference value is displayed, and computing the difference between the second time measurement and the current time measurement. In block 406, the decoder video buffer transfer routine checks if a command to measure time has been received from the communication processor 206. When the command to measure time is received, the decoder gets the current system time and places it and the temporal reference value in a decoder queue as shown in block 408. When a screen output routine in the decoder finishes preparing a frame for display in block 410, it compares the temporal reference for the frame with the temporal reference values in the decoder queue in block 412. If a match is found in block 414, the decoder determines the current system time, retrieves the time tag from the decoder queue, and computes the difference between the current system time and the time tag value in block 416. This difference in values represents the delay in decoding the video data. When the decoded frame information is sent to display 106, the video decode delay value is also transferred to communication processor 206 as shown in block 418. The flowchart diagrams in FIG. 4 represent a portion of the logic and data processing that is executed for each frame of video data.

Figure 5:
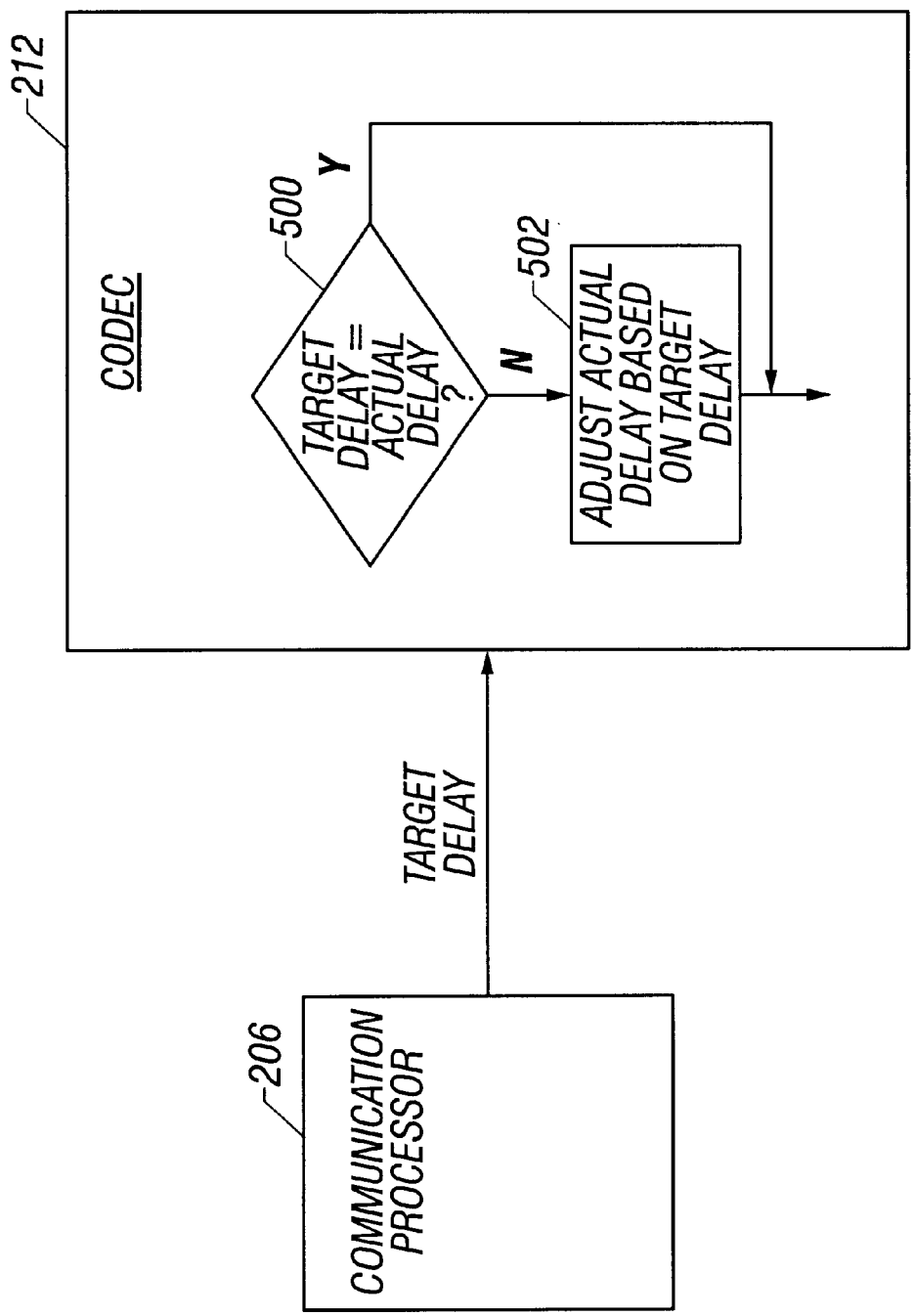
FIG. 5 is a flowchart diagram for introducing delay in the audio codec. The use of the same reference symbols in different drawings indicates similar or identical items.

To lip sync the audio and video information, communication processor 206 transmits a target transmit audio delay signal and target receive audio delay signal to audio codec 212 as shown in FIG. 5. The target audio delay values are based on the video encode/decode delay values. Audio codec 212 determines if there is a difference between the delay value currently being used and the target audio delay value in block 500. Audio codec 212 adds or subtracts delay in small incremental steps in block 502. This technique is also referred to as ramping in the delay and it helps prevent video conference participants from detecting the change in delay. When the target delay is reached, the delay becomes static until a new target is received. When a new target is received before the old target is reached, the old target is abandoned and the new target is ramped in.

Communication processor 206 determines the target delay values by measuring the video encode delay and video decode delay. In one embodiment, communication processor 206 takes multiple measurements of the video encode delay and the video decode delay over time and computes weighted running average values of the delays. In other embodiments, various known signal processing techniques for determining the delay value from multiple measurements may be utilized. A composite encoding delay value is determined by adding a constant offset representing the delay introduced by communication processor 206 and by encoding the audio data to the average value for encoding the video delay. A composite decoding delay value is determined by adding a constant offset representing the delay introduced by communication processor 206 and by decoding the audio data to the average value for decoding the video delay. At selected times, communication processor 206 transmits the composite encoding delay values to audio codec 212 as target transmit delay values, and the composite decoding delay values to audio codec 212 as target receive delay values. Various techniques may be utilized to determine the times to transmit the target delay values. In one embodiment, target values are transmitted whenever the difference between the target value and the value being used is above or below a threshold criteria. In another embodiment, the threshold value may be determined empirically. Alternatively, the threshold may be a constant value or a function of one or more variables. For example, a constant threshold value of plus or minus 30 milliseconds may be used. A limit on the frequency that an updated target delay value is transmitted may be used in addition to, or instead of, the threshold criteria. For example, an embodiment may limit transmission of a new target delay value to once every ten time delay measurements.

The present invention for dynamically determining delay values to synchronize audio and video signals may be implemented in hardware, software, firmware, or a combination of hardware, software and firmware. A known data processor, such as a microprocessor-based computer, as well as other hardware, firmware, and software devices, may be used to implement the present invention. The present invention may be utilized in video conference systems, as well as other systems where it is desired to synchronize audio and video signals. The present invention provides particular advantages in situations where it is desirable to adjust delay values without interrupting the transmission and reception of data. The present invention is applicable to any standardized coding schemes having separate signals, multiplexed signals, and even separate coding schemes for audio and video data. The present invention may also be applied to systems having other types of data signals that must be synchronized, such as two video signals, two audio signals, as well as other types of data signals beside audio and video signals. Any coding standard having separate signals for the different types of data may utilize the present invention. Examples of such known coding standards include MPEG1–4, H.320, H.321, H.322, H.323 V1/V2, and H.324. The present invention may also be applicable to coding standards currently under development and those which will be developed in the future.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed is:

1. A method for measuring video encoding delay for a frame of video data, wherein the measured video encoding delay is used to synchronize an audio data signal with a video data signal, the method comprising:

receiving a frame of video data;

associating a first time tag with the frame of video data, the first time tag being based on the time the video data was received;

encoding the frame of video data;

associating a second time tag with the encoded video data, the second time tag being based on the time the video data was encoded; and determining the video encoding delay based on the first time tag and the second time tag.

2. A method for measuring video decoding delay for a frame of encoded video data, wherein the measured video decoding delay is used to synchronize an audio data signal with a video data signal, the method comprising:

parsing encoded video data for a picture start code and a temporal reference value;

sampling system time to generate a first timer value;

decoding the frame of encoded video data;

sampling system time to generate a second timer value after decoding the frame of encoded video data; and determining the video decoding delay based on the first timer value and the second timer value.

3. A method for introducing a target time delay value in an audio codec, wherein the target time delay value is used to synchronize an audio data signal with a video data signal, the method comprising:

determining a video time delay value;

generating the target time delay value based on an offset value and the video time delay value; and transmitting the target time delay value to the audio codec.

4. The method, as recited in claim 3, wherein a plurality of video time delay values are determined, the method further comprising generating an average value of the video time delay values, and generating the target time delay value based on the average value of the video time delay values and the offset value.

5. The method, as recited in claim 4, wherein the offset value is based on a fixed data processing time delay value and an audio time delay value.

6. The method, as recited in claim 3, wherein the audio codec adjusts an actual time delay value based on the target delay value.

7. The method, as recited in claim 6, wherein the actual time delay value is adjusted by ramping in the target delay value over a period of time.

8. A method for synchronizing an audio data signal with a video data signal, the method comprising:
- receiving a frame of video data;
- associating a first time tag with the frame of video data, the first time tag being based on the time the video data was received;
- encoding the frame of video data;
- associating a second time tag with the encoded video data, the second time tag being based on the time the video data was encoded;
- determining a video encoding delay value based on the first time tag and the second time tag;
- generating a target time delay value based on an offset value and the video encoding delay value; and
- transmitting the target time delay value to an audio codec.

9. A method for synchronizing an audio data signal with a video data signal, the method comprising:
- parsing encoded video data for a picture start code and a temporal reference value;
- sampling system time to generate a first timer value;
- decoding the frame of encoded video data;
- sampling system time to generate a second timer value after decoding the frame of encoded video data;
- determining a video decoding delay value based on the first timer value and the second timer value;
- generating a target time delay value based on an offset value and the video decoding delay value; and
- transmitting the target time delay value to an audio codec.

10. An apparatus for measuring video encoding delay for a frame of video data, wherein the measured video encoding delay is used to synchronize an audio data signal with a video data signal, the apparatus comprising:
- a video encoder coupled to a video interface to receive a frame of video data; and
- a communication processor coupled to the video encoder, the communication processor being operable to transmit data to and receive data from the video encoder, the video encoder being operable to:
  - associate a first time tag with the frame of video data, the first time tag being based on the time the video data was received from the video interface;
  - encode the frame of video data;
  - associate a second time tag with the encoded video data, the second time tag being based on the time the video data was encoded; and
  - determine the video encoding delay based on the first time tag and the second time tag.

11. An apparatus for measuring video decoding delay for a frame of video data, wherein the video decoding delay is used to synchronize an audio data signal with a video data signal, the apparatus comprising:
- a video decoder coupled to receive a frame of encoded video data from a communication processor, the communication processor being operable to parse the encoded video data to detect a picture start code and to transmit a timer command to the video decoder when the picture start code is detected, the video decoder being operable to:
  - sample system time to generate a first timer value when the timer command is received from the communication processor;
  - decode the frame of encoded video data;
  - sample system time to generate a second timer value after substantially decoding the frame of encoded video data; and
  - determine the video decoding delay based on the first timer value and the second timer value.

12. An apparatus for synchronizing a decoded audio data signal with a decoded video data signal, the apparatus comprising:
- a video decoder coupled to a communication processor, the communication processor being operable to transmit data to and receive data from the video decoder, the video decoder being operable to generate a decode time delay value based on the amount of time required to decode an encoded video image; and
- an audio decoder coupled to the communication processor, the communication processor being further operable to:
  - transmit data to and receive data from the audio decoder;
  - receive the decoding time delay value from the video decoder;
  - generate a target time delay value based on an offset value and the decode time delay value; and
  - transmit the target time delay value to the audio decoder.

13. The apparatus, as recited in claim 12, wherein the communication processor receives a plurality of decode time delay values corresponding to a plurality of decoded video images, the communication processor being further operable to generate an average value of the decode time delay values and to generate the target time delay value based on the offset value and the average value of the decode time delay values.

14. The apparatus, as recited in claim 12, wherein the offset value is based on a fixed data processing time delay and an audio decoding time delay.

15. The apparatus, as recited in claim 12, wherein the audio decoder is further operable to adjust an actual time delay value based on the target delay value.

16. The apparatus, as recited in claim 15, wherein the audio decoder adjusts the actual time delay value by ramping in the target delay value over period of time.

17. An apparatus for introducing a target time delay value in an audio codec, wherein the target time delay value is used to synchronize an audio data signal with a video data signal, the apparatus comprising:
- a video codec operable to determine a video time delay value; and
- a communication processor coupled to receive data from the video codec and to transmit data to the audio codec, the communication processor being operable to generate the target time delay value based on an offset value and the video time delay value, and to transmit the target time delay value to the audio codec.

18. The apparatus, as recited in claim 17, wherein the video codec is operable to determine a plurality of video time delay values, and the communication processor is operable to generate an average value of the video time delay values and to generate the target time delay value based on the offset value and the average value of the video time delay values.

19. The apparatus, as recited in claim 17, wherein the offset value is based on a fixed data processing time delay value and an audio time delay value.

20. The apparatus, as recited in claim 17, wherein the audio codec is operable to adjust an actual time delay value based on the target delay value.

21. The apparatus, as recited in claim 20, wherein the actual time delay value is adjusted by ramping in the target delay value over a period of time.

22. A system for synchronizing transmission of encoded frames of data comprising:
- a first encoder coupled to a first interface to receive a first frame of data;
- a data processor coupled to the first encoder, the data processor being operable to transmit data to the first encoder and receive data from the first encoder, the first encoder being operable to:
  - associate a first time tag with the first frame of data, the first time tag being based on the time the first frame of data was received from the first interface;
  - encode the first frame of data to generate a first encoded frame of data;
  - associate a second time tag with the first encoded frame of data, the second time tag being based on the time the first frame of data was encoded;
  - determine an encoding delay based on the first time tag and the second time tag; and
  - transmit the encoding delay to the data processor; and
- a second encoder coupled to a second interface to receive a second frame of data, the second encoder being further coupled to the data processor, the data processor being operable to transmit data to the second encoder and receive data from the second encoder, the data processor being further operable to generate a target delay value based on the encoding delay and an offset value, and to transmit the target delay value to the second encoder, the second encoder being operable to:
  - receive the target delay value from the data processor;
  - encode the second frame of data to generate a second encoded frame of data; and
  - transmit the second encoded frame of data at a time based on the target delay value.

23. A system for synchronizing presentation of decoded frames of data comprising:
- a data processor coupled to a first decoder, the data processor being operable to transmit a first frame of data to the first decoder and receive data from the first decoder, the first decoder being operable to:
  - associate a first time tag with the first frame of data, the first time tag being based on the time the first frame of data was received from the data processor;
  - decode the first frame of data to generate a first decoded frame of data;
  - associate a second time tag with the first decoded frame of data, the time tag being based on the time the first frame of data was substantially decoded;
  - determine a decoding delay based on the first time tag and the second time tag; and
  - transmit the decoding delay to the data processor; and
- a second decoder coupled to the data processor, the data processor being operable to transmit data to the second decoder and receive data from the second decoder, the data processor being further operable to generate a target delay value based on the decoding delay and an offset value, and to transmit the target delay value to the second decoder, the second decoder being operable to:
  - receive the target delay value from the data processor;
  - decode the second frame of data to generate a second decoded frame of data; and
  - transmit the second decoded frame of data at a time based on the target delay value.

24. The system, as recited in claim 23, wherein the first decoders are operable to determine a plurality of video time delay values, and the data processor includes a signal processor operable to generate a processed delay value based on the plurality of video time delay values, the communication processor being further operable to generate the target delay value based on the offset value and the processed delay value.

* * * * *